United States Patent
De Berker et al.

(10) Patent No.: US 11,875,114 B2
(45) Date of Patent: Jan. 16, 2024

(54) METHOD AND SYSTEM FOR EXTRACTING INFORMATION FROM A DOCUMENT

(71) Applicant: ELEMENT AI Inc., Montreal (CA)

(72) Inventors: Archy De Berker, Montreal (CA); Simon Lemieux, Montreal (CA)

(73) Assignee: ServiceNow Canada Inc., Montreal (CA)

( * ) Notice: Subject to any disclaimer, the term of this patent is extended or adjusted under 35 U.S.C. 154(b) by 184 days.

(21) Appl. No.: 17/078,777

(22) Filed: Oct. 23, 2020

(65) Prior Publication Data

US 2021/0124874 A1    Apr. 29, 2021

Related U.S. Application Data

(60) Provisional application No. 62/925,863, filed on Oct. 25, 2019.

(51) Int. Cl.
*G06F 40/289*    (2020.01)
*G06F 40/30*    (2020.01)
*G06F 40/205*    (2020.01)

(52) U.S. Cl.
CPC .......... *G06F 40/289* (2020.01); *G06F 40/205* (2020.01); *G06F 40/30* (2020.01)

(58) Field of Classification Search
CPC ...... G06F 40/289; G06F 40/205; G06F 40/30; G06F 40/279
See application file for complete search history.

(56) References Cited

U.S. PATENT DOCUMENTS

| | | | |
|---|---|---|---|
| 10,803,248 B1 * | 10/2020 | Arfa | G06N 20/00 |
| 2002/0165707 A1 * | 11/2002 | Call | G06F 40/284 |
| | | | 704/2 |

(Continued)

OTHER PUBLICATIONS

Rebecka Weegar et al. 2015. Linking Entities Across Images and Text. In Proceedings of the Nineteenth Conference on Computational Natural Language Learning, pp. 185-193, Beijing, China. Association for Computational Linguistics.; https://aclanthology.org/K15-1019/ (Year: 2015).*

(Continued)

*Primary Examiner* — Pierre Louis Desir
*Assistant Examiner* — Keisha Y. Castillo-Torres
(74) *Attorney, Agent, or Firm* — Fasken Martineau DuMoulin (57) ABSTRACT

A method for extracting information from a document, comprising: receiving an identification of an entity to be extracted from the document; identifying candidates from the document, each candidate corresponding to a given element contained in the document and having a given location within the document; embedding the candidates, thereby obtaining an embedding vector for each candidate; for each candidate, comparing in a semantic space the respective embedding vector to previous embedding vectors associated with previous entity values previously chosen for the entity, thereby obtaining a first comparison result; for each candidate, comparing in a pixel space the given location within the document of the candidate to a location associated with the previous entity values previously chosen for the entity, thereby obtaining a second comparison result; sorting the candidates using the first and second comparison results obtained for each candidate, thereby obtaining sorted candidates; and outputting the sorted candidates.

19 Claims, 5 Drawing Sheets

(56) References Cited

U.S. PATENT DOCUMENTS

| | | | |
|---|---|---|---|
| 2011/0184983 A1* | 7/2011 | Kwantes | G06F 16/34 |
| | | | 707/776 |
| 2012/0123768 A1* | 5/2012 | Liu | G06F 40/10 |
| | | | 704/E11.001 |
| 2018/0165581 A1* | 6/2018 | Hwang | G06N 3/08 |
| 2018/0025349 A1 | 9/2018 | Natchu | |
| 2018/0253496 A1 | 9/2018 | Natchu | |
| 2018/0293215 A1* | 10/2018 | Jang | G06F 40/279 |
| 2020/0097718 A1* | 3/2020 | Schäfer | G06V 30/414 |
| 2020/0117751 A1* | 4/2020 | Kim | G06F 16/313 |
| 2020/0192921 A1* | 6/2020 | Satterfield | G06F 16/3323 |
| 2020/0394257 A1* | 12/2020 | Santoso | G06F 16/90324 |
| 2021/0004437 A1* | 1/2021 | Zhang | G06F 40/205 |

OTHER PUBLICATIONS

Weegar, R. et al., "Linking Entities Across Images and Text", Proceedings of the 19th Conference on Computational Language Learning, Jul. 30-31, 2015, pp. 185-193.

\* cited by examiner

METHOD AND SYSTEM FOR EXTRACTING INFORMATION FROM A DOCUMENT

TECHNICAL FIELD

The present invention relates to the field of methods and systems for extracting information from a document, and more particularly to automatic extraction of information.

BACKGROUND

At least some of the systems for extracting information from a document rely either upon templates or large amounts of labelled training data. In the former case, the resulting systems are rigid and require intensive maintenance. In the latter, labelled data is difficult and expensive to acquire, often necessitating manual labelling.

Therefore, there is a need for an improved method and system for extracting information from a document.

SUMMARY

According to a first broad aspect, there is provided a computer-implemented method for extracting information from a document, comprising: receiving an identification of an entity to be extracted from the document; identifying candidates from the document, each candidate corresponding to a given element contained in the document and having a given location within the document; embedding the candidates, thereby obtaining an embedding vector for each candidate; for each candidate, comparing in a semantic space the respective embedding vector to previous embedding vectors associated with previous entity values previously chosen for the entity, thereby obtaining a first comparison result; for each candidate, comparing in a pixel space the given location within the document of the candidate to a location associated with the previous entity values previously chosen for the entity, thereby obtaining a second comparison result; sorting the candidates using the first and second comparison results obtained for each candidate, thereby obtaining sorted candidates; and outputting the sorted candidates.

In one embodiment, the step of identifying the candidates comprises identifying all elements contained in the document and said embedding the candidates comprises embedding all of the identified elements.

In one embodiment, the step of comparing the embedding vector to previous embedding vectors comprises comparing the embedding vector to an average value of the previous embedding vectors previously chosen for the entity.

In one embodiment, the step of comparing in the semantic space the embedding vector to previous embedding vectors previously chosen for the entity comprises determining a distance in the semantic space between the embedding vector and the average value.

In one embodiment, the step of determining the distance between the embedding vector and the average value is performed using a cosine similarity method.

In one embodiment, the step of comparing in the semantic space the embedding vector to previous embedding vectors previously chosen for the entity comprises comparing the embedding vector to a distribution of the previous embedding vectors previously chosen for the entity.

In one embodiment, the step of comparing the respective location to the location associated with the previous entity values previously chosen for the entity comprises comparing a location vector associated with the candidate to an average value of previous location vectors associated with the previous entity values previously chosen for the entity.

In one embodiment, the step of comparing the location vector associated with the candidate to the average value of the previous location vectors comprises determining a distance in the pixel space between the location vector and the average value of the previous location vectors.

In one embodiment, the method further comprises assigning a first weighting factor to the first comparison result and a second weighting factor to the second comparison result.

In one embodiment, the step of assigning the first weighting factor to the first comparison result comprises, for each candidate, multiplying a distance in the semantic space between the embedding vector and an average value of previous embedding vectors associated with the previous entity values previously chosen for the entity by the first weighting factor, thereby obtaining a first weighted value; the step of assigning the second weighting factor to the second comparison result comprises for each candidate multiplying a distance in the pixel space between a location vector associated with the candidate and an average location of previous location vectors associated with the previous entity values previously chosen for the entity by the second weighting factor, thereby obtaining a second weighted value; and the step of sorting is performed based on a sum of the first and second weighted value for each candidate.

In one embodiment, the method further comprises receiving the first and second weighting factors from a user device.

In one embodiment, the first and second weighting factors are automatically determined.

In one embodiment, the step of identifying the candidates is performed using at least one of optical character recognition and parsing on the document.

In one embodiment, the document is one of an image and a PDF document.

In one embodiment, the step of said outputting the sorted candidates comprises displaying the sorted candidates on a display unit.

In one embodiment, the method further comprises receiving an identification of a given one of the sorted candidates, thereby identifying the given one of the sorted candidates as being a desired value for the entity, and storing the given one of the sorted candidates for future use as one of the previous entity values previously chosen for the entity.

In one embodiment, the step of said outputting the sorted candidates comprises displaying a highest ranked one of the sorted candidates on a display unit.

In one embodiment, the method further comprises receiving a user input and filtering the sorted candidates using the user input, thereby obtaining filtered candidates, and outputting the filtered candidates.

In one embodiment, the method further comprises, for each candidate, determining the location within the document.

In one embodiment, the method further comprises for each candidate, determining a context vector indicative of a local context for the candidate and comparing the context vector to previous context vectors associated with the previous entity values previously chosen for the entity, thereby obtaining a third comparison result, said sorting the candidates being further performed based on the third comparison result.

According to another broad aspect, there is provided a system for extracting information from a document, comprising: a candidate extractor for receiving an identification of an entity to be extracted from the document and identifying candidates from the document, each candidate corresponding to a given element contained in the document and having a given location within the document; a semantic vector generator for generating for each candidate, an embedding vector indicative of a meaning of the candidate; a location vector generator for generating for each candidate, a location vector indicative of a location of the candidate within the document; a sorting unit for sorting the candidates based on a first comparison between the embedding vector of each candidate to previous embedding vectors associated with previous entity values previously chosen for the entity and a second comparison between the location vector of each candidate to previous location vectors associated with the previous entity values previously chosen for the entity, and for outputting the sorted candidates.

In one embodiment, the candidate extractor is configured for identifying all elements contained in the document and said embedding the candidates comprises embedding all of the identified elements.

In one embodiment, the sorting unit is configured for comparing the embedding vector to an average value of the previous embedding vectors previously chosen for the entity.

In one embodiment, the sorting unit is configured for said comparing in the semantic space the embedding vector to previous embedding vectors previously chosen for the entity by determining a distance in the semantic space between the embedding vector and the average value.

In one embodiment, the sorting unit is configured for said determining the distance between the embedding vector and the average value using a cosine similarity method.

In one embodiment, the sorting unit is configured for comparing the embedding vector to a distribution of the previous embedding vectors previously chosen for the entity.

In one embodiment, the sorting unit is configured for comparing a location vector associated with the candidate to an average value of previous location vectors associated with the previous entity values previously chosen for the entity.

In one embodiment, the sorting unit is configured for said comparing the location vector associated with the candidate to the average value of the previous location vectors by determining a distance in the pixel space between the location vector and the average value of the previous location vectors.

In one embodiment, the sorting unit is further configured for assigning a first weighting factor to the first comparison result and a second weighting factor to the second comparison result.

In one embodiment, the sorting unit is configured for: for each candidate, multiplying a distance in the semantic space between the embedding vector and an average value of previous embedding vectors associated with the previous entity values previously chosen for the entity by the first weighting factor, thereby obtaining a first weighted value; and for each candidate multiplying a distance in the pixel space between a location vector associated with the candidate and an average location of previous location vectors associated with the previous entity values previously chosen for the entity by the second weighting factor, thereby obtaining a second weighted value, said sorting being performed based on a sum of the first and second weighted value for each candidate.

In one embodiment, the sorting unit is configured for receiving the first and second weighting factors from a user device.

In one embodiment, the sorting unit is configured for determining the first and second weighting factors.

In one embodiment, the candidate extractor is configured for identifying the candidates using at least one of optical character recognition and parsing on the document.

In one embodiment, the document is one of an image and a PDF document.

In one embodiment, the sorting unit is configured for providing the sorted candidates for display on a display unit.

In one embodiment, the sorting unit is further configured for receiving an identification of a given one of the sorted candidates, thereby identifying the given one of the sorted candidates as being a desired value for the entity, and storing the given one of the sorted candidates for future use as one of the previous entity values previously chosen for the entity.

In one embodiment, the sorting unit is configured for providing a highest ranked one of the sorted candidates for display on a display unit.

In one embodiment, the sorting unit is further configured for receiving a user input and filtering the sorted candidates using the user input, thereby obtaining filtered candidates, and outputting the filtered candidates.

In one embodiment, the candidate extractor is further configured for, for each candidate, determining the location within the document.

In one embodiment, the system further comprises a context vector generator for, for each candidate, determining a context vector indicative of a local context for the candidate, the sorting unit being further configured for comparing the context vector to previous context vectors associated with the previous entity values previously chosen for the entity, thereby obtaining a third comparison result, and sorting the candidates further based on the third comparison result.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

In the following, there is described a method and a system for extracting information from a document. The type of information or entity to be extracted from the document is provided by a user. The system stores in memory the values for the entities that were previously selected by users.

If necessary, optical character recognition is first performed on the document to identify the elements contained in the document such as words, expressions, numbers, postal codes, etc., as known in the art. The identified elements are then considered as being candidates for the target value of the entity to be extracted from the document. Using an adequate embedding method, an embedding vector is generated for each candidate and for each embedding vector, the location of the respective candidate within the document is associated with the embedding vector.

In one embodiment, for each embedding vector, the distance between the embedding and the previously selected values for the same entity is then computed in a semantic space, thereby providing a first distance value associated with each embedding vector. For example, the distance between the embedding and the average value for the previously selected values for the same entity may be computed.

Then, for each embedding vector, the distance between the location associated with the embedding vector (i.e. the location within the document of the candidate associated with the embedding vector) and the location of the previously selected values for the same entity is computed in a pixel space, thereby providing a second distance value associated with each embedding vector. For example, the distance between the location associated with the embedding vector and the average location of the previously selected values for the same entity may be computed in the pixel space.

The candidates are then sorted using the first and second distance values determined for each embedding vector. For example, a weighted sum of the first and second distance values may be computed for each embedding vector and the sorting of the candidates may be performed based on the weighting sums.

The sorted candidates are then outputted. For example, at least the candidate having the highest rank resulting may be displayed on an electronic device.

Figure 1:
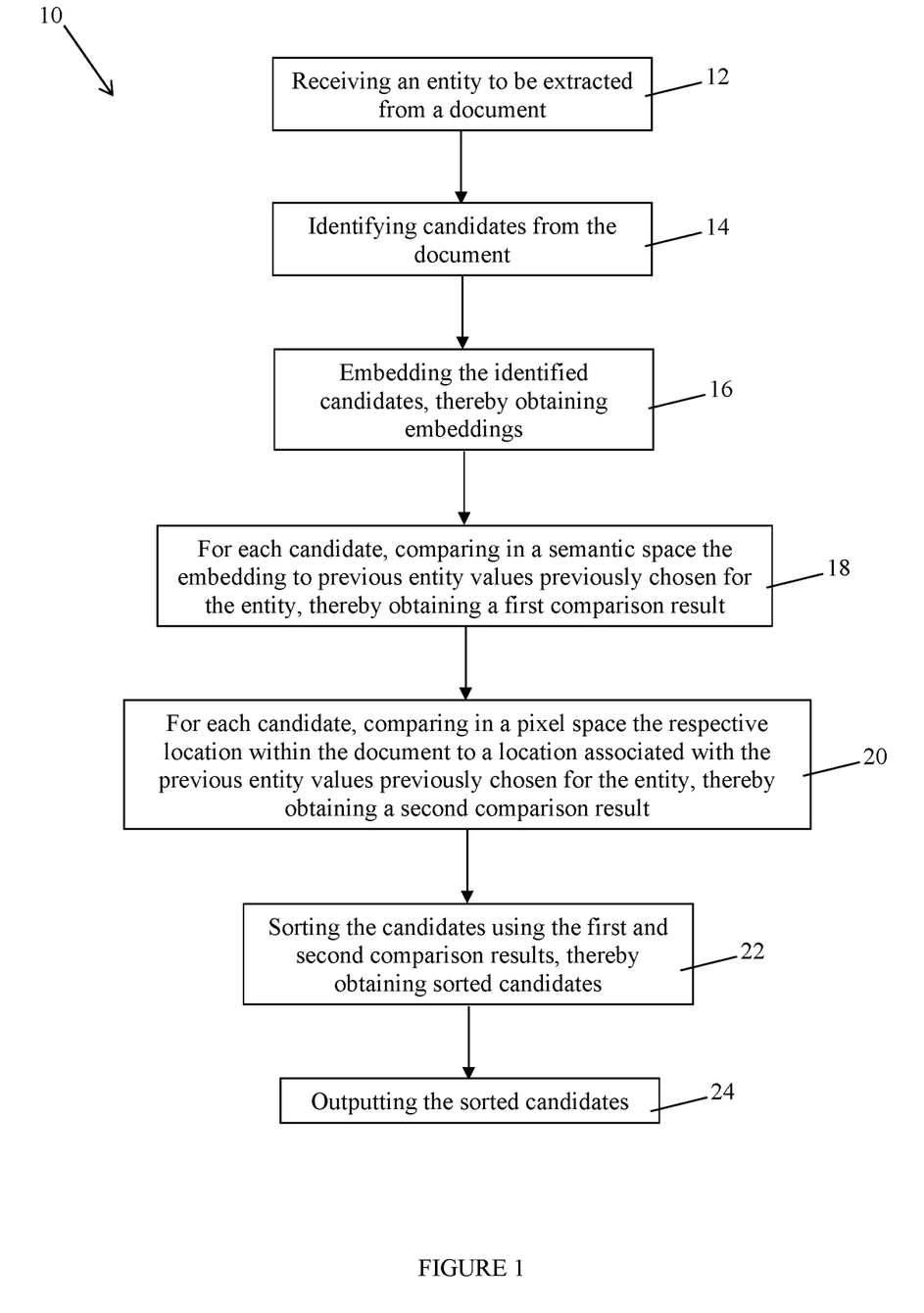
FIG. 1 is a flow chart illustrating a method for extracting information from a document, in accordance with a first embodiment.

FIG. 1 illustrates one exemplary computer-implemented method 10 for extracting information from a document. The method 10 may be executed by a server or any adequate computer device.

At step 12, an entity or type of information to be extracted from the document is received. For example, the entity to be extracted may be received from an electronic device of a user using the method 10. The entity may be any kind or type of information such as a name, an address, a postal code, an age, a brand or make, a product model, etc. In one embodiment, an entity is a piece of information that the user would like to extract and store in a structured manner such as a relational database system. The purpose of the method 10 is to extract the entity value from the document. For example, when the entity to be extracted from the document is the make of a car, the entity value may be Toyota™ or Ford™.

At step 14, candidates for the entity value are identified within the document. Candidates corresponds to elements contained within the document such as words, expressions, numbers, any combinations of letters and numbers such as postal codes, any combinations of characters including special characters such as passwords, etc.

In one embodiment, elements may be combined in different manners to produce candidates. For instance, if the words "Archy's" "Carpet" "Shop" and "Montreal" are present in the document, the following candidates may be created: "Archy's", "Archy's Carpet", "Archy's Carpet Shop". "Archy's Carpet Shop", "Carpet", "Carpet Shop", etc.

The system may learn which ones of the possible candidates are likely to be correct e.g. for Organization Names candidates comprising multiple words may be expected while for First Names candidates comprising a single word may be expected.

The step 14 of identifying candidates within the document also includes identifying the location within the document for each candidate. As a result, a respective location within the document is associated with each candidate.

In one embodiment, the location of a candidate is expressed as a vector of real numbers.

In one embodiment, the elements are already identified when the document is received. In this case, the step 14 comprises identifying the location within the document of each identified candidate.

In another embodiment, optical character recognition (OCR) is performed after the reception of the document. For example, the document may be an image or a Pdf™ document. In this case, OCR is performed on the document in order to identify the elements contained in the document such as words, expressions, numbers etc. and the identified elements correspond to the candidates.

In one embodiment, all of the elements contained in the document are identified as being candidates for the entity value. In this case, each and every element contained in the document such as words, expression, numbers, etc. is identified as being a candidate.

In another embodiment, only some of the elements contained within the document are identified as being candidates. For example, only words and expressions may be identified as being candidates while any elements containing a number or a special character may be discarded.

At step 16, an embedding vector is generated for each candidate identified at step 14. It should be understood that any adequate method for generating a vector representation of any candidate may be used.

As a result any candidate identified at step 14 is associated with a respective embedding vector that represents the candidate in a continuous vector space and each embedding vector is associated with a respective candidate. It should be understood that at least some characteristics of a candidate may be associated with the respective embedding vector. For example, the identified location within the document of a candidate is also associated with the respective embedding vector.

At step 18, for each candidate, the respective embedding vector is compared to the embedding vectors of previous entity values that were previously chosen or selected for the same entity in a semantic space. It should be understood the previous entity values refer to the vector representations of the previous entity values that were selected for the same entity. It should also be understood that the previous values that were chosen for the same entity may have been chosen by a user or automatically chosen by the method 10 and validated by the user.

In one embodiment, for each candidate, each embedding vector is compared to the average value of the previous entity values that were previously chosen for the same entity. In one embodiment, the comparison step 18 comprises determining the distance in the semantic space between the embedding vector and the average value of the previous entity values that were previously chosen for the same entity, as described above.

In another embodiment, for each candidate, each embedding vector is compared to the distribution of previous entity values that were previously chosen for the same entity. For this purpose, all of the embedding vectors corresponding to the previous choices are stored in memory to define a probability distribution. Each candidate then receives a score corresponding to its probability in this distribution. One implementation of this uses Gaussian Mixture Models (GMM) for example.

The comparison step 18 provides a first comparison result for each candidate. When a distance in the semantic space between an embedding vector and the previous entity values that were previously chosen for the same entity is computed, the step 18 provides a first distance value for each candidate.

At step 20, the location within the document associated with each candidate is compared in a pixel space to the locations within their respective document of the previous entity values that were previously chosen for the same entity. In one embodiment, the step 20 comprises, for each candidate, determining in the pixel space the distance between the location within the document associated with the candidate and the average location within their respective document of the previous entity values that were previously chosen for the same entity. It should be understood that the location of a candidate may be expressed as a location vector in the pixel space.

In another embodiment, for each candidate, each location is compared to the distribution of the locations of the previous entity values that were previously chosen for the same entity. For this purpose all locations corresponding to the previous choices are stored in memory to define a probability distribution. Each candidate then receives a location score corresponding to its probability in this distribution. One implementation of this uses Gaussian Mixture Models (GMM) for example.

The comparison step 20 provides a second comparison result for each candidate. When the distance in the pixel space between the location of a candidate and the average distance of the previous entity values that were previously chosen is determined, the comparison step 20 provides a second distance value for each candidate.

At step 20, the candidates are sorted based on the first comparison result obtained for each candidate at step 18 and on the second comparison result obtained for each candidate at step 20. As a result of the sorting step 22, each candidate is assigned a score which is indicative of a rank. The candidate being provided with the highest rank corresponds to the candidate having the greatest probability to correspond to the target value for the entity. The candidate being provided with the second highest rank corresponds to the candidate having the second greatest probability to correspond to the target value for the entity, etc.

In an embodiment in which the comparison steps 18 and 20 provides the first distance value in the semantic space and the second distance value in the pixel space, respectively, the score assigned at step 22 for each candidate corresponds to a weighted sum of the first and second distance values, as described in greater detail below. In this case, a first weighting factor is assigned to the first distance while a second weighting factor is assigned to the second distance.

In one embodiment, the value of the first weighting factor and that of the second weighting factor are each comprised between zero and one. In the same or another embodiment, the sum of the first and second weighting factors is equal to one.

In one embodiment, the values of the first and second weighting factors is constant for all entities and/or for all documents. For example, the same values for the first and second weighting factors are used for all entities to be extracted from a document while values of the first and second weighting factors for the same entities may vary from one document to another. In another example, the values for the first and second weighting factors may vary from one entity to another for a same document.

In another embodiment, the same values for the first and second weighting factors are used for any entity to be extracted from a same document. The values for the first and second weighting factors may vary for a same entity to be extracted from one document to another.

In one embodiments, the values for the first and second weighting factors is inputted by the user and received from the user electronic device.

In another embodiment, the values for the first and second weighting factors is automatically determined. In one embodiment, the weighting factors are determined from the outputs of the location and semantic steps, and the system learns a linear combination of the two in order to optimize the classification of the candidates for each entity. In one example, a logistic regression may be used. In another example, a decision tree or random forest may be used.

Referring back to FIG. 1, the sorted candidates are outputted at step 24. In one embodiment, the sorted candidates corresponds to the list of all of the candidates identified at step 14 to which a respective ranking is associated. In another embodiment, the sorted candidates only comprise a given number of candidates, i.e. the first x number of candidates being provided with the highest rank according to the sorting step 22. For example, only the ten highest ranked candidates may be outputted.

In one embodiment, the sorted candidates are stored in memory. In the same or another embodiment, the sorted candidates are transmitted to the user electronic device to be displayed thereon.

In one embodiment, the method 10 further comprises a step of filtering the sorted candidates before outputting them. In this case, the method 10 comprises receiving an input from the user electronic device and filtering the sorted candidates according to the user input. For example, the user may input the first character or characters of the target value for the entity. In this case, the sorted candidates are filtered using the user input, i.e. only the candidates that start with the character or character(s) inputted by the user are kept while all of the candidates of which the first character or characters do not correspond to the character(s) inputted by the user are discarded. The candidates that were retained are sorted again using the first ranking that was assigned to candidates at step 22. For example, if three candidates have been identified and only the first and third candidates are kept after the filtering step, then the candidate that was ranked first remains first while the candidate that was ranked third is now ranked second.

In one embodiment, the method 10 further comprises a step of receiving an identification of the type of document to which the document from which information is to be extracted belongs. In this case, different sets of previous entity values that were previously chosen are each associated with a respective type of document. The method 10 then comprises a step of retrieving the set of previous entity values that is associated with the received type of documents.

In one embodiment, the identification of the type of document to which the document from which information is to be extracted is inputted by the user and received from the user electronic device.

In another embodiment, the step of receiving the type of document comprises automatically determining the type of document associated with the document from which information is to be extracted. For example, a pre-trained document classification system may be used. In one embodiment, this is based upon an image classification network built with a convolutional neural network. In another embodiment, a text classification network, built with either a recurrent, convolutional, or attentional neural network may be used. In either case, the system may be trained using back-propagation with a cross-entropy loss function to optimize the probability of a document being assigned to the correct class, for example.

Figure 2:
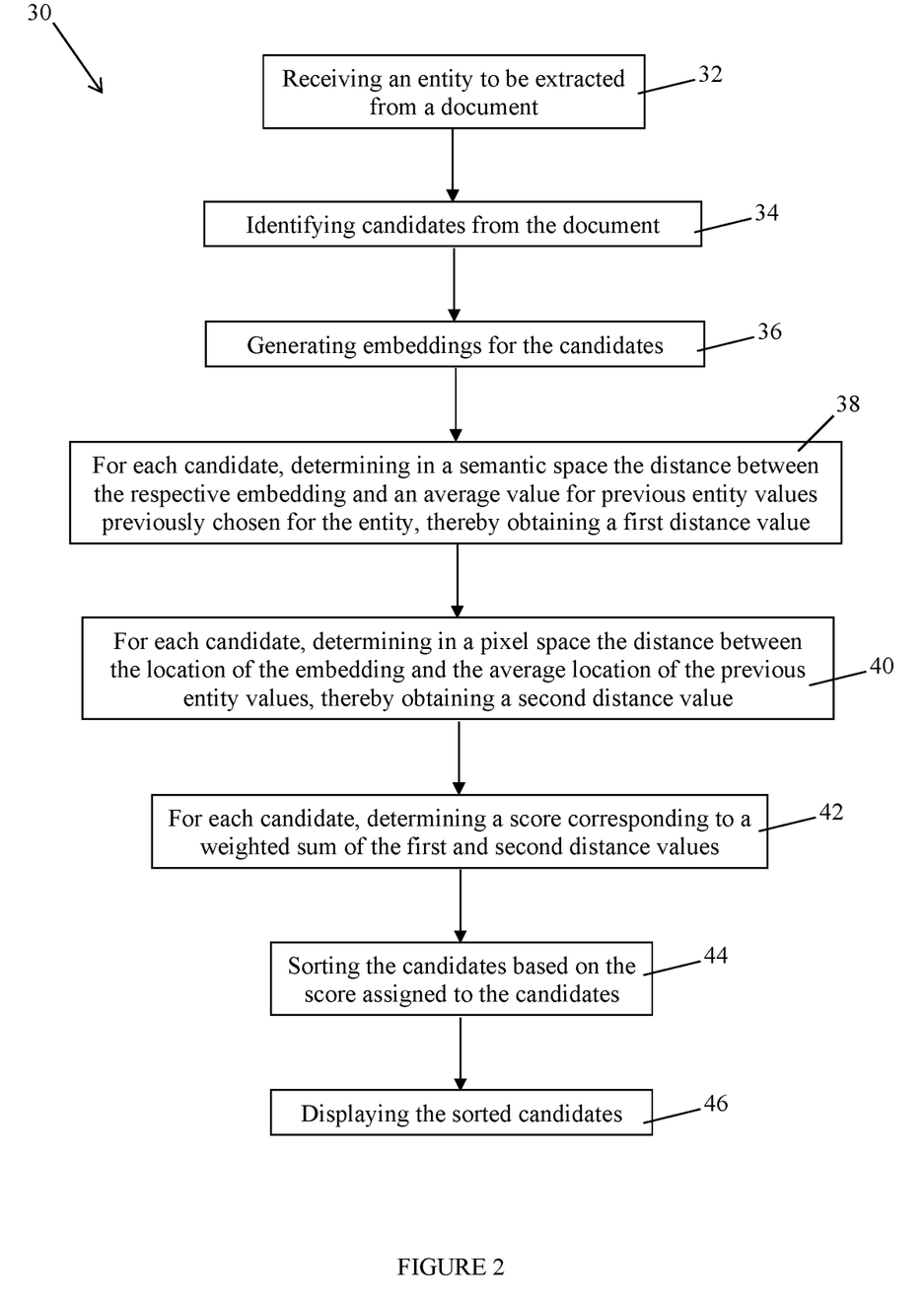
FIG. 2 is a flow chart illustrating a method for extracting information from a document, in accordance with a second embodiment.

FIG. 2 illustrates one exemplary computer-implemented method 30 for extracting information from a document, which corresponds to a particular embodiment of the method 10. The method 30 may be implemented by any computer device such as a server.

Similarly to the method 10, the first step 32 of the method 30 consists in receiving the entity to be extracted from the document, i.e. an identification of the entity to be extracted from the document.

At step 34, candidates are extracted from the document and the location within the document of each candidate is determined. In one embodiment, the candidates correspond to all of the elements contained in the document.

As described above, OCR may be performed on the document prior to the identification of the candidates.

At step 36, an embedding vector is created for each candidate using any adequate embedding method such as a word embedding method. As a result, each candidate is associated with a respective embedding vector and the location within the document of each candidate is associated with the respective embedding vector.

At step 38, for each candidate, the distance in a semantic space between the respective embedding vector and an average value for previous entity values that were previously selected for the same entity is determined. For example, the cosine similarity method may be used for calculating the distance of step 38. In another embodiment, a Euclidean distance, a Manhattan distance or a Pearson Correlation may be computed. The result of step 38 is a first distance in the semantic space.

At step 40, for each candidate, the distance in a pixel space between the location of the candidate within the document and the average location within their respective document of the previous entity values that were previously selected for the same entity. The result of step 40 is a second distance in the pixel space.

At step 42, a score is calculated for each candidate based on the first and second distances determined at step 38 and 40 for each candidate. The score assigned to a given candidate corresponds to a weighted sum of the first and second distances determined for the given candidate. The weighted sum is obtained by summing the first distance multiplied by a first weighting factor and the second distance multiplied by a second weighting factor. In one embodiment, the first and second weighting factors are each comprised between zero and one and the sum of the first and second weighting factors equals to one.

At step 44, the candidates identified at step 34 are sorted based on the score assigned to the candidates at step 42. The candidate having the highest score assigned thereto is ranked first, the candidate having the second highest score assigned thereto is ranked second, etc.

Finally the sorted candidates are outputted at step 46. As described above, the sorted candidates or only a portion of the sorted candidates may be displayed on the user electronic device.

In one embodiment, the method 10, 30 further comprises a step of determining the local context of each candidate. In one embodiment, the local context corresponds to the contents and location of the candidates around the candidate in question. For instance, if the candidate is "Quebec", the local context might include the words above (e.g. "St Laurent Boulevard"), to the right (e.g. "H2G 78L"), and below (e.g. "Canada"). The local context is expressed as a context vector of real numbers. Which items constitute the local context can be based upon the distance between boxes (e.g. all boxes within a certain radius constitute a local context) or learned using a graph convolutional network for example.

Once a respective context vector has been determined for each candidate, the context vector of each candidate is compared to previous or reference context vectors that have been determined for previous entity values that were previously selected for the same entity to be extracted, thereby obtaining a third comparison result. The step 22 of sorting the candidates is then further performed taking into account the third comparison result in addition to the first and second comparison results obtained at steps 18 and 20.

In one embodiment, the step of comparing the context vector associated with a candidate to previous or reference context vectors comprises, for each candidate, determining a distance between the context vector associated with a candidate and the average value of the previous or reference context vectors that have been determined for previous entity values that were previously selected for the same entity to be extracted. In one embodiment, the distance is determined in a high dimensional abstract space which combines features of both spatial and semantic context. For example, the context vector may be defined as the average embedding of all the words within 10 cm of a given candidate. This will capture the fact that the "First Name" candidates tend to be near words corresponding to last names, addresses, perhaps even the phrase "Name" on the page. The average value of this context embedding across all the correct answers may be stored, and the similarity between this vector and each candidates may be used to contribute to the score for each candidate.

Figure 3:
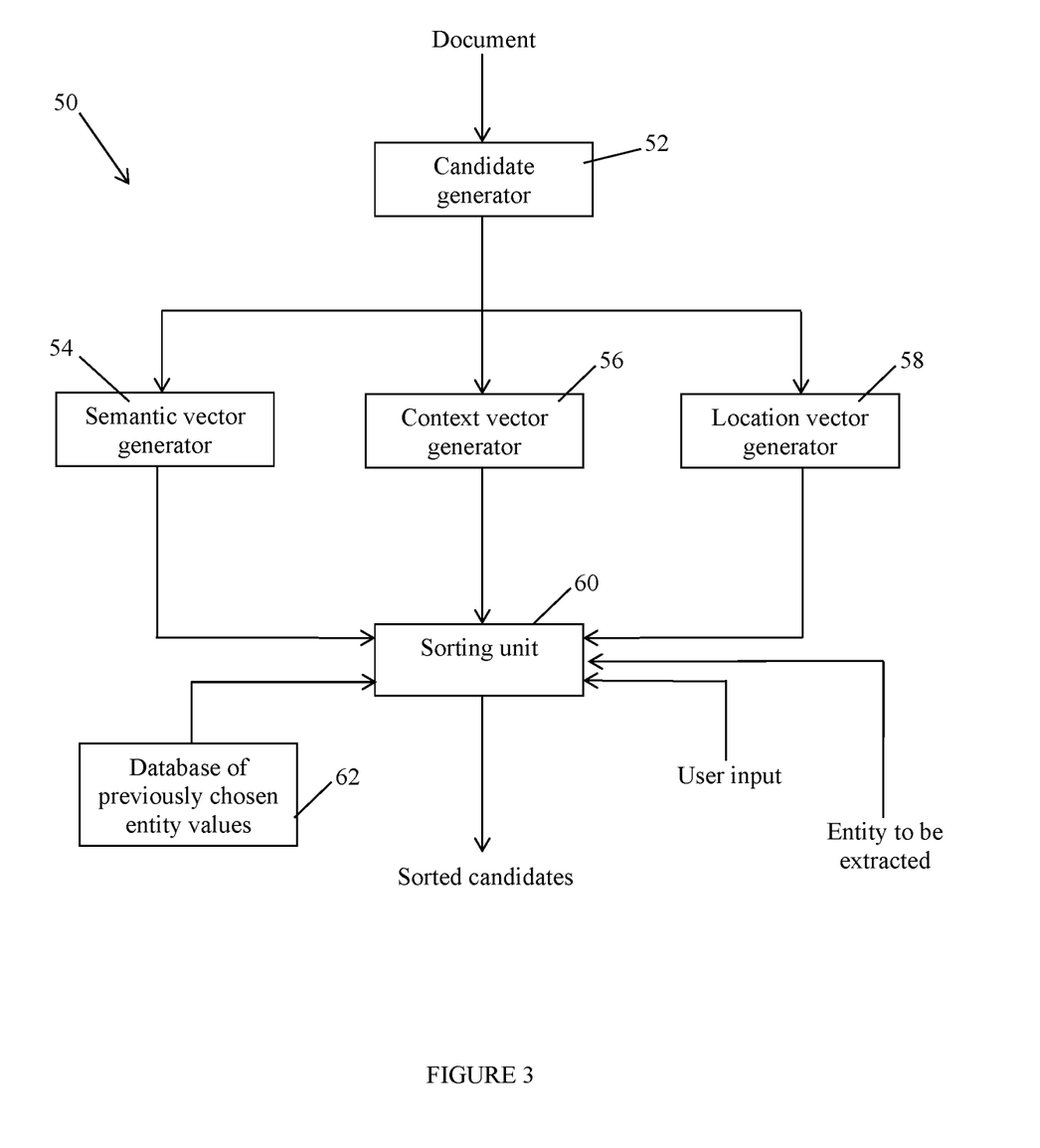
FIG. 3 is a block diagram for extracting information from a document, in accordance with an embodiment.

FIG. 3 illustrates one embodiment of a system 50 configured for executing the above-described method 10, 30. The system 50 comprises a candidate generator 52, a semantic vector generator 54, a context vector generator 56, a location vector generator 58, a sorting unit 60 and a database 62.

The candidate generator 52 is configured for receiving a document and identifying the elements that are contained in the received document. The identified elements then correspond to the candidates. For example and as described above, an element may be any combination of characters having a meaning such as a word, a number, a postal code, etc. In one embodiment, the candidate generator 52 comprises an OCR system for identifying the candidates. In the same or another embodiment, the candidate generator 52 comprises a parser for identifying the candidates, such as a PDF parser when the received document is a PDF document.

The identified candidates are then transmitted to the semantic vector generator 54, the context vector generator 56 and the location vector generator 58.

The semantic vector generator 54 is configured for applying an embedding model such as a word embedding mode to the candidates in order to generate a vector representation of each candidate in a semantic space. As a result, a respective semantic embedding vector is associated with each candidate and the semantic embedding vector represents the meaning of the candidate in the semantic space.

The context vector generator 56 is configured for applying a context model to the candidates in order to generate a local context representation of each candidate. As a result, a respective context vector is generated and associated with each candidate.

The location vector generator 58 is configured for determining the respective location within the document of each candidate in order to obtain a representation of the candidate within the pixel space. As a result, a respective location vector is associated with each candidate and the location vector is indicative of the location of its respective candidate within the document.

The vectors generated by the semantic vector generator 54, the context vector generator 56 and the location vector 58, and the candidates to which they are associated are transmitted to the sorting unit 60. The sorting unit 60 receives an identification of the entity to be extracted from the document and is configured for determining the most likely value for the entity by ranking the candidates as a function of their likelihood of being the right value for the entity.

The sorting unit 60 is in communication with the database 62 which contains previously selected values for the same entity. For each possible entity to be extracted from the document, the database contains the entity values that were previously selected for the entity, which includes the semantic embedding vector value, the context vector value and the location vector value that were determined and associated with for the previously selected entity value. As a result, for each possible entity, the database 62 comprises a set of previous entity values that were previously selected for the same entity and for each previous entity value, the database 62 also comprises the semantic embedding vector, the context vector and the location vector that were associated with the previous entity value.

The sorting unit 60 is configured for accessing the database 62 and, for each candidate, performing the following comparisons:

comparing the semantic embedding vector determined for the candidate to the previous semantic embedding vectors associated with the previous entity values that were previously selected for the same entity;

comparing the context vector determined for the candidate to the previous context vectors associated with the previous entity values that were previously selected for the same entity; and comparing the location vector determined for the candidate to the previous location vectors associated with the previous entity values that were previously selected for the same entity.

The results of three comparisons are then used by the sorting unit 62 for ranking the candidates. The candidate being provided with the first rank is the candidate that has the highest likelihood to be the right value for the entity. The candidate being provided with the second rank is the candidate that has the second highest likelihood to be the right value for the entity. The candidate being provided with the third rank is the candidate that has the third highest likelihood to be the right value for the entity, etc.

In one embodiment, each comparison result comprises a distance. In this case the sorting unit 60 is configured for determining, for each candidate, a first or semantic distance, a second or context distance and a third or location distance.

As described above, the semantic distance may correspond to the distance in the semantic space between the semantic embedding vector determined for the candidate and the average value for the previous semantic embedding vectors associated with the previous entity values that were previously selected for the same entity. In another example, the semantic distance may be obtained by comparing the semantic embedding vector determined for the candidate and the distribution of the previous semantic embedding vectors associated with the previous entity values that were previously selected for the same entity.

The context distance may correspond to the distance between the context vector determined for the candidate and the average value for the previous context vectors associated with the previous entity values that were previously selected for the same entity.

The location distance may correspond to the distance in the pixel space between the location vector determined for the candidate and the average value for the previous location vectors associated with the previous entity values that were previously selected for the same entity.

The sorting unit 60 is further configured for assigning a score to each candidate based on the three comparison results. The score assigned to each candidate is indicative of the rank of the candidate.

In an embodiment in which distances are calculated, the score assigned to a candidate, and therefore the rank assigned to the candidate are determined based on the semantic distance, the context distance and the location distance. In one embodiment, the score corresponds to a weighted sum of the semantic distance, the context distance and the location distance. In this case, a weighting factor is assigned to each distance, i.e. a first weighting factor is assigned to the semantic distance, a second weighting distance is assigned to the context distance and a third weighting factor is assigned to the location distance. The score assigned to the candidate then corresponds to the sum of the semantic distance multiplied by the first weighting factor, the context distance multiplied by the second weighting factor and the location distance multiplied by the third weighting factor.

In one embodiment, the candidate having the greatest score is ranked first, the candidate having the second greatest score is assigned the second rank, the candidate having the third greatest score is assigned the third rank, etc.

The sorting unit 60 is further configured for outputting the sorted candidates. In one embodiment, the sorting unit 60 is configured for transmitting the sorted candidates to the user electronic device to be displayed thereon.

In one embodiment, the sorting unit 60 is configured for outputting all of the sorted candidates. In another embodiment, the sorting unit 60 is configured for outputting only a portion of the sorted candidates. For example, the sorting unit 60 may configured for outputting only the top 10 candidates. In a further example, the sorting unit 60 may be configured for outputting only the highest ranked candidate.

In one embodiment, the sorting unit 60 is configured for storing into the database 62 the candidate that was ranked first so that it may be used as a previously selected entity value for a next use of the system 50. It should be understood that the sorting unit 60 stores the semantic embedding vector, the contact vector and the location vector associated with the first ranked candidate into the database 62.

In one embodiment, the sorting unit 60 is further configured for receiving from the user electronic device a user input and filtering the sorted candidates according to the user input.

In one embodiment, the user input is received after displaying the sorted candidates on the user electronic device and comprises an identification of a given one of the displayed candidates as being the desired value for the entity. In this case, the sorting unit 60 receives the identification of the candidate identified by the user as being the desired entity value and stores into the database 62 the candidate identified by the user as being the desired entity value along with its associated semantic embedding, context and location vectors.

In another embodiment, the user input comprises the first character(s) of the desired entity value. In this case, the user input may be received before displaying the sorted candidates and the sorted candidates are filtered using the user input. to only select the sorting candidates of which the first character(s) correspond(s) to the character(s) inputted by the user. The filtered and sorted candidates may then be displayed to the user on the user electronic device who selects the desired value for the entity.

In one embodiment, the system 50 is trained as follows.

When the system 50 is first used by the user, the system 50 only identified the candidates for the received document and determines the associated vectors for the candidates since no previously selected candidates exist in the database 62 for the entity. Therefore, the sorting of the identified candidates cannot be performed according to previously identified entity values. In this case, the sorting unit 60 of the system 50 may rank the candidates in alphabetic order for example. In another example, the sorting unit 60 may rank the candidates randomly.

The sorted candidates are then displayed on the user electronic device and the user selects the desired value for the entity from the displayed sorted candidates.

An identification of the candidate selected by the user is then received by the sorting unit 60 which stores in the database 62 the selected candidate and its associated semantic embedding vector, context vector and location vector.

Then the system 50 operates as described above. When an entity is to be extracted from a document, the system 50 first identifies the candidates from the document and determines for each candidate, its corresponding semantic embedding vector, context vector and location vector. The system 50 then compares for each candidates the three associated vectors to corresponding previously selected vector values as described above, and the candidates are ranked using the comparison results as described above.

In one embodiment, the context vector generator 56 is omitted. In this case, the sorting unit 60 is configured for sorting the candidates only based on the semantic embedding vectors and the location vectors determined for the identified candidates.

In one embodiment, the above-described method and system allow the use of machine learning models or algorithms within a user interaction paradigm that facilitates the cheap collection of high-quality labeled data, and facilitates the on-line improvement of machine learning models.

Figure 4:
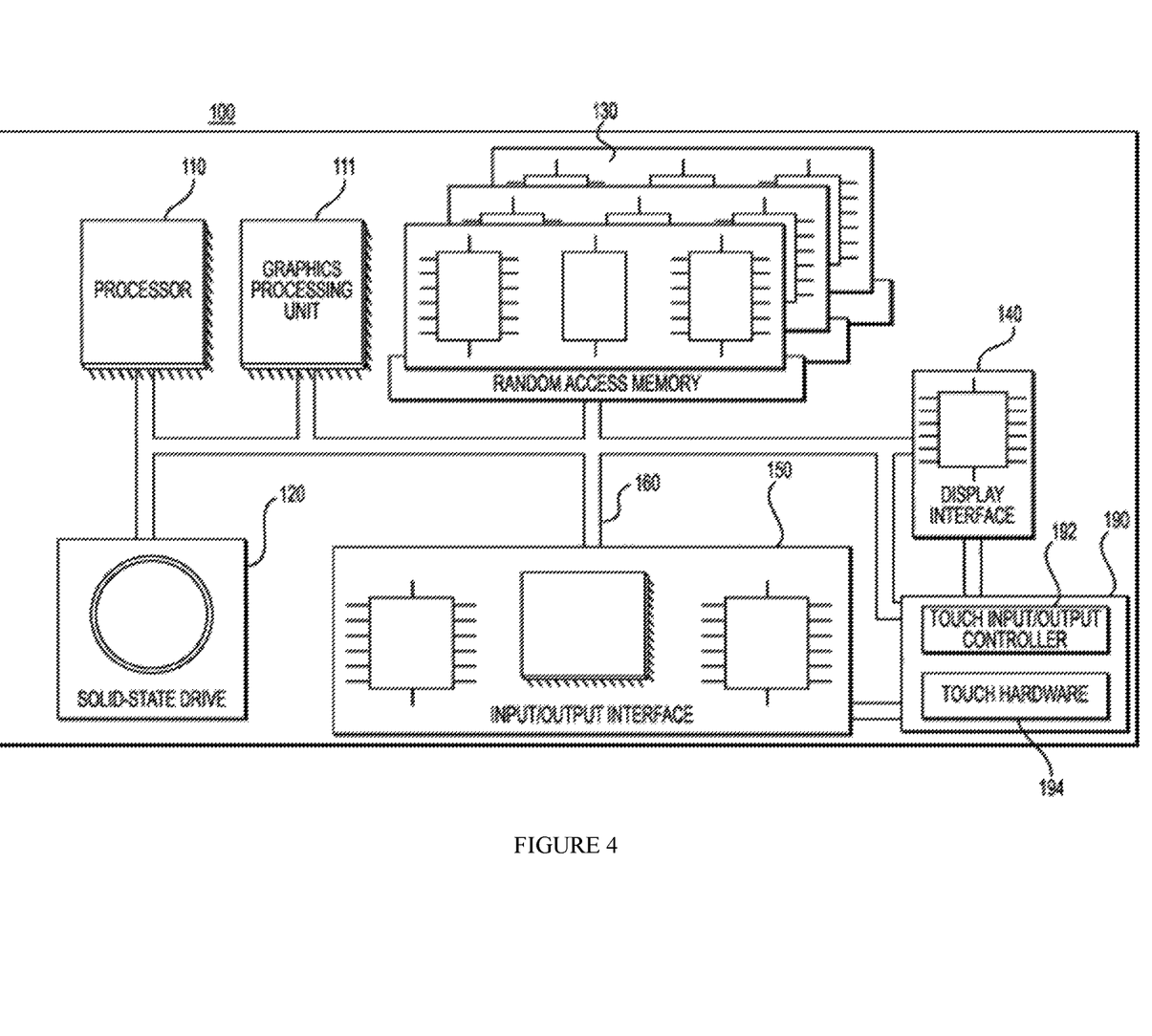
FIG. 4 depicts a schematic diagram of an electronic device in accordance with one or more non-limiting embodiments of the present technology.

Now referring to FIG. 4, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 2, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for training a machine learning algorithm to perform object classification using byte representations thereof. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

Figure 5:
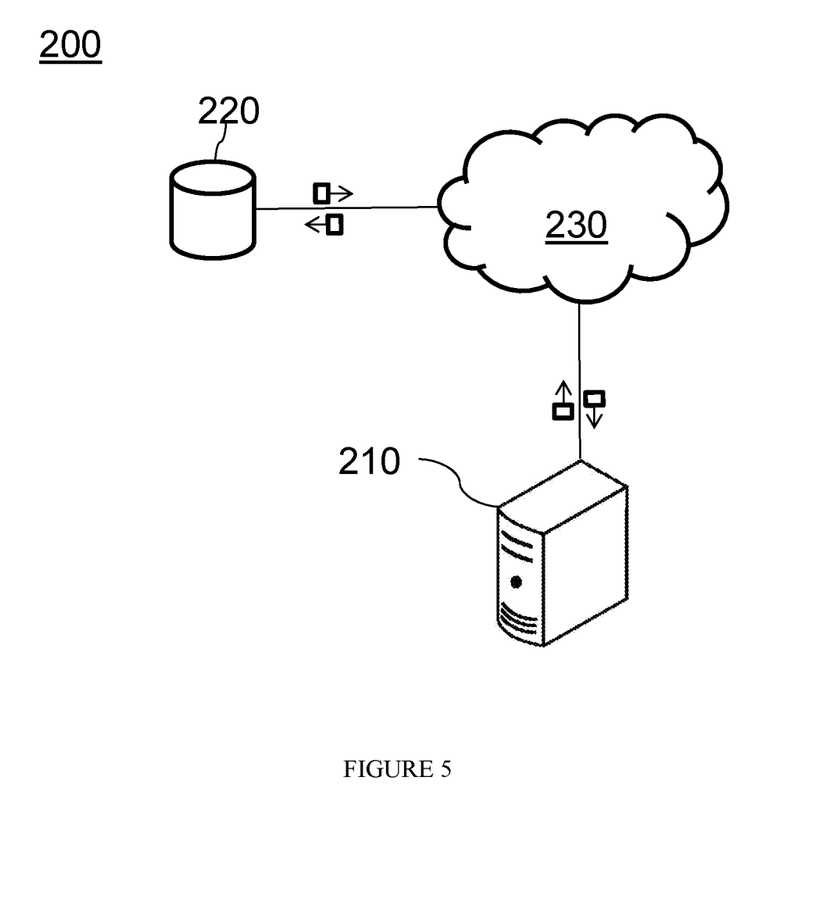
FIG. 5 depicts a schematic diagram of a system in accordance with one or more non-limiting embodiments of the present technology.

Now referring to FIG. 5, there is shown a schematic diagram of a system 200 suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a server 210, and a database 220, communicatively coupled over a communications network 230 via respective communication links.

The server 210 is configured for extracting information from a document by performing the following steps: (i) receiving an identification of an entity to be extracted from the document; (ii) identifying candidates from the document, each candidate corresponding to a given element contained in the document and having a given location within the document; (iii) embedding the candidates, thereby obtaining an embedding vector for each candidate; (iv) for each candidate, comparing in a semantic space the respective embedding vector to previous embedding vectors associated with previous entity values previously chosen for the entity, thereby obtaining a first comparison result; (v) for each candidate, comparing in a pixel space the given location within the document of the candidate to a location associated with the previous entity values previously chosen for the entity, thereby obtaining a second comparison result; (vi) sorting the candidates using the first and second comparison results obtained for each candidate, thereby obtaining sorted candidates; and (vii) outputting the sorted candidates.

How the server 210 is configured to do so will be explained in more detail herein below.

It will be appreciated that the server 210 can be implemented as a conventional computer server and may comprise at least some of the features of the electronic device 100 shown in FIG. 4. In a non-limiting example of one or more embodiments of the present technology, the server 210 is implemented as a server running an operating system (OS). Needless to say that the server 210 may be implemented in any suitable hardware and/or software and/or firmware or a combination thereof. In the disclosed non-limiting embodiment of present technology, the server 210 is a single server. In one or more alternative non-limiting embodiments of the present technology, the functionality of the server 210 may be distributed and may be implemented via multiple servers (not shown).

The implementation of the server 210 is well known to the person skilled in the art. However, the server 210 comprises a communication interface (not shown) configured to communicate with various entities (such as the database 220, for example and other devices potentially coupled to the communication network 240) via the network. The server 210 further comprises at least one computer processor (e.g., the processor 110 of the electronic device 100) operationally connected with the communication interface and structured and configured to execute various processes to be described herein.

The server 210 may have access to one or more machine learning algorithms (MLAs). The MLA(s) may undergo a training procedure, as described above.

In one or more embodiments, the server 210 may execute the MLA(s). In one or more alternative embodiments, the MLA(s) may be executed by another server (not depicted), and the server 210 may access the MLA(s) for training or for use by connecting to the server (not shown) via an API (not depicted), and specify parameters of the MLA(s), transmit data to and/or receive data from the MLA(s), without directly executing the MLA(s).

As a non-limiting example, one or more MLAs may be hosted on a cloud service providing a machine learning API.

A database 220 is communicatively coupled to the server 210 via the communications network 230 but, in one or more alternative implementations, the database 220 may be communicatively coupled to the server 210 without departing from the teachings of the present technology. Although the database 220 is illustrated schematically herein as a single entity, it will be appreciated that the database 220 may be configured in a distributed manner, for example, the database 220 may have different components, each component being configured for a particular kind of retrieval therefrom or storage therein.

The database 220 may be a structured collection of data, irrespective of its particular structure or the computer hardware on which data is stored, implemented or otherwise rendered available for use. The database 220 may reside on the same hardware as a process that stores or makes use of the information stored in the database 220 or it may reside on separate hardware, such as on the server 210. The database 220 may receive data from the server 210 for storage thereof and may provide stored data to the server 210 for use thereof.

In one or more embodiments of the present technology, the database 220 is configured to inter alia: (i) store documents; (ii) store training and validation data; (iv) store parameters of MLA(s) 240; and/or the like.

In one or more embodiments of the present technology, the communications network 230 is the Internet. In one or more alternative non-limiting embodiments, the communication network 230 may be implemented as any suitable local area network (LAN), wide area network (WAN), a private communication network or the like. It will be appreciated that implementations for the communication network 230 are for illustration purposes only. How a communication link between the server 210, the database 220, and/or another electronic device (not shown) and the communications network 230 is implemented will depend inter alia on how each electronic device is implemented.

The embodiments of the invention described above are intended to be exemplary only. The scope of the invention is therefore intended to be limited solely by the scope of the appended claims.

We claim:

1. A computer-implemented method for extracting information from a document, the computer-implemented method being executed by at least one processor operatively connected to a non-transitory storage medium, the computer-implemented method comprising:
   receiving, from a user electronic device, an identification of an entity to be extracted from the document;
   identifying candidates from the document, each candidate corresponding to a respective candidate entity value for the entity contained in the document and having a respective location within the document
   embedding, using a word embedding model, each of the respective candidate entity value, thereby obtaining a respective embedding vector;
   generating, for each of the respective candidate entity value, a respective location vector based on the respective location within the document;
   retrieving, from the non-transitory storage medium, previous embedding vectors and previous location vectors associated with previous entity values previously chosen for the entity;
   comparing in a semantic space the respective embedding vector of each of the respective candidate entity value to the previous embedding vectors associated with the previous entity values by determining a respective distance in the semantic space between the respective embedding vector and the previous embedding vectors, thereby obtaining a first comparison result;
      comparing in a pixel space the respective location within the document of each of the respective candidate entity value to a respective previous location associated with the previous entity values previously chosen for the entity by determining a respective distance in the pixel space between the respective location vector and the previous location vectors of the previous entity values, thereby obtaining a second comparison result;
      sorting the candidates using the first and second comparison results obtained for each of the respective candidate entity value, thereby obtaining sorted candidates;
      receiving, from the user electronic device, a user input comprising at least one character;
      filtering, based on the user input comprising the at least one character, the sorted candidates to obtain filtered candidates; and
      outputting, to the user electronic device, the filtered candidates for display.

2. The computer-implemented method of claim 1, wherein said comparing the respective embedding vector to previous embedding vectors comprises determining the respective distance in the semantic space between the respective embedding vector and an average value of the previous embedding vectors previously chosen for the entity.

3. The computer-implemented method of claim 2, wherein said determining the respective distance between the embedding vector and the average value is performed using a cosine similarity method.

4. The computer implemented method of claim 2, wherein said comparing in the pixel space the respective location within the document of each of the respective candidate entity value to the respective previous location associated with the previous entity values previously chosen for the entity comprises determining the respective distance in the pixel space between the respective location vector associated with the candidate to an average value of the previous location vectors associated with the previous entity values previously chosen for the entity.

5. The computer-implemented method of claim 2, further comprising assigning a first weighting factor to the first comparison result and a second weighting factor to the second comparison result.

6. The computer-implemented method of claim 5, wherein:
   said assigning the first weighting factor to the first comparison result comprises, for each of the respective candidate entity value, multiplying the respective distance in the semantic space by the first weighting factor, thereby obtaining a first weighted value;
   said assigning the second weighting factor to the second comparison result comprises, for each of the respective candidate entity value, multiplying the respective distance in the pixel space between by the second weighting factor, thereby obtaining a second weighted value; and
   said sorting being performed based on a sum of the first and second weighted value for each of the respective candidate entity value.

7. The computer-implemented method of claim 1, further comprising for each of the respective candidate entity value, determining a respective context vector indicative of a respective local context for the respective candidate entity value and comparing the respective context vector to previous context vectors associated with the previous entity values previously chosen for the entity, thereby obtaining a third comparison result, said sorting the candidates being further performed based on the third comparison result.

8. The computer-implemented method of claim 1, wherein said identifying the candidates from the document comprises one of: performing optical character recognition (OCR) on the document and parsing the document.

9. The computer-implemented method of claim 1, further comprising:
   receiving, from the user electronic device, an identification of a respective one of the sorted candidates; and
   storing, in the non-transitory storage medium, the respective one of the sorted candidates for future use as one of the previous entity values previously chosen for the entity.

10. A system for extracting information from a document, the system comprising:
   a non-transitory storage medium storing computer-readable instructions thereon; and
   at least one processor operatively connected to the non-transitory storage medium,
   the at least one processor, upon executing the computer-readable instructions, being configured for:
   receiving, from a user electronic device, an identification of an entity to be extracted from the document;
   identifying candidates from the document, each candidate corresponding to a respective candidate entity value for the entity contained in the document and having a respective location within the document;
   generating, for each of the respective candidate entity value, using a word embedding model, a respective embedding vector indicative of a respective meaning of the respective candidate entity value;
   generating, for each of the respective candidate entity value, a respective location vector indicative of a location of the respective candidate entity value within the document;

retrieving, from the non-transitory storage medium, previous embedding vectors and previous location vectors associated with previous entity values previously chosen for the entity;

comparing in a semantic space the respective embedding vector of each of the respective candidate entity value to the previous embedding vectors associated with the previous entity values by determining a respective distance in the semantic space between the respective embedding vector and the previous embedding vectors, thereby obtaining a first comparison result;

comparing in a pixel space the respective location within the document of each of the respective candidate entity value to a respective previous location associated with the previous entity values previously chosen for the entity by determining a respective distance in the pixel space between the respective location vector and the previous location vectors of the previous entity values, thereby obtaining a second comparison result;

sorting the candidates based on the first comparison result and the second comparison result, thereby obtaining sorted candidates;

receiving, from the user electronic device, a user input comprising at least one character;

filtering, based on the user input comprising the at least one character, the sorted candidates to obtain filtered candidates; and outputting, to the user electronic device, the filtered candidates for display.

11. The system of claim 10, wherein the comparing the respective embedding vector to previous embedding vectors comprises determining the respective distance in the semantic space between the respective embedding vector to an average value of the previous embedding vectors previously chosen for the entity.

12. The system of claim 11, wherein the at least one processor is configured for said determining the respective distance between the embedding vector and the average value using a cosine similarity method.

13. The system of claim 11, wherein the comparing in the pixel space the respective location within the document of each of the respective candidate entity value to the respective previous location associated with the previous entity values previously chosen for the entity comprises determining the respective distance in the pixel space between the respective location vector to an average value of previous location vectors associated with the previous entity values previously chosen for the entity.

14. The system of claim 13, wherein the at least one processor is further configured for assigning a first weighting factor to the first comparison result and a second weighting factor to the second comparison result.

15. The system of claim 14, wherein the at least one processor is configured for:
for each of the respective candidate entity value, multiplying the respective distance in the semantic space by the first weighting factor, thereby obtaining a first weighted value; and
for each of the respective candidate entity value, multiplying the respective distance in the pixel space by the second weighting factor, thereby obtaining a second weighted value,
said sorting being performed based on a sum of the first and second weighted value for each candidate.

16. The system of claim 10, wherein the at least one processor is further configured for:
for each of the respective candidate entity value, determining a respective context vector indicative of a respective local context for the respective candidate entity value;
comparing the respective context vector to previous context vectors associated with the previous entity values previously chosen for the entity, thereby obtaining a third comparison result; and
said sorting the candidates is further based on the third comparison result.

17. The system of claim 10, wherein said identifying the candidates from the document comprises one of: performing optical character recognition (OCR) on the document and parsing the document.

18. The system of claim 10, wherein the at least one processor is further configured for:
receiving, from the user electronic device, an identification of a respective one of the sorted candidates; and
storing, in the non-transitory storage medium, the respective one of the sorted candidates for future use as one of the previous entity values previously chosen for the entity.

19. A computer-implemented method for extracting information from a document, the computer-implemented method being executed by at least one processor operatively connected to a non-transitory storage medium, the computer-implemented method comprising:
receiving, from a user electronic device, an identification of an entity to be extracted from the document;
identifying candidates within the document, each candidate corresponding to a respective entity value for the entity contained in the document and having a respective location within the document;
embedding, using a word embedding model, each of the respective candidate entity value, thereby obtaining a respective embedding vector;
generating, for each of the respective candidate entity value, a respective location vector based on the respective location within the document;
retrieving, from the non-transitory storage medium, previous embedding vectors and previous location vectors associated with previous entity values previously chosen for the entity;
determining, for each of the respective candidate entity value, a respective distance in the semantic space between the respective embedding vector and an average of the previous embedding vectors, thereby obtaining a first comparison result;
multiplying, for each of the respective candidate entity value, the respective distance in the semantic space by a first weighting factor, thereby obtaining a first weighted value;
determining, for each of the respective candidate entity value, the respective distance in the pixel space between the respective location vector and an average value of the previous location vectors of the previous entity values, thereby obtaining a second comparison result;
multiplying, for each of the respective candidate entity value, the respective distance in the pixel space by a second weighting factor, thereby obtaining a second weighted value;
sorting the candidates using a respective sum of the first weighted value and the second weighted value obtained for each of the respective candidate entity value, thereby obtaining sorted candidates;

receiving, from a user electronic device, a user input comprising at least one character;

filtering, based on the user input comprising the at least one character, the sorted candidates to obtain filtered candidates; and outputting, to the user electronic device, the filtered candidates.

\* \* \* \* \*